United States Patent
Modali et al.

(10) Patent No.: US 7,286,550 B2
(45) Date of Patent: Oct. 23, 2007

(54) SINGLE CYCLE WEIGHTED RANDOM EARLY DETECTION CIRCUIT AND METHOD

(75) Inventors: Prasad Modali, San Jose, CA (US); Nirmal Raj Saxena, Los Altos Hills, CA (US)

(73) Assignee: Tundra Semiconductor Corporation (CA)

( * ) Notice: Subject to any disclaimer, the term of this patent is extended or adjusted under 35 U.S.C. 154(b) by 970 days.

(21) Appl. No.: 10/318,769

(22) Filed: Dec. 13, 2002

(65) Prior Publication Data

US 2003/0112814 A1  Jun. 19, 2003

Related U.S. Application Data

(60) Provisional application No. 60/341,342, filed on Dec. 14, 2001.

(51) Int. Cl.
*H04L 12/28* (2006.01)
(52) U.S. Cl. .................. 370/412; 370/235
(58) Field of Classification Search ............ 370/412, 370/235
See application file for complete search history.

(56) References Cited

U.S. PATENT DOCUMENTS

| | | | |
|---|---|---|---|
| 5,737,314 A | 4/1998 | Hatono et al. | 370/235 |
| 6,252,848 B1 | 6/2001 | Skirmont | 370/229 |
| 6,333,917 B1 | 12/2001 | Lyon et al. | 370/236 |
| 6,463,068 B1 | 10/2002 | Lin et al. | 370/414 |
| 6,856,596 B2 * | 2/2005 | Blumer et al. | 370/230 |
| 6,996,062 B1 * | 2/2006 | Freed et al. | 370/235 |
| 7,106,731 B1 * | 9/2006 | Lin et al. | 370/389 |
| 2002/0188648 A1 * | 12/2002 | Aweya et al. | 709/102 |
| 2003/0086140 A1 * | 5/2003 | Thomas et al. | 359/167 |

* cited by examiner

*Primary Examiner*—Brian Nguyen
(74) *Attorney, Agent, or Firm*—LaRiviere, Grubman & Payne, LLP

(57) ABSTRACT

A system and method is provided for traffic management and regulation in a packet-based communication network, the system and method facilitating proactive, discriminating congestion control on a per flow basis of packets traversing the Internet via use of a Weighted Random Early Detection (WRED) algorithm that monitors the incoming packet queue and optimizes enqueuing or discard of incoming packets to stabilize queue length and promote efficient packet processing. During optimized discard conditions, the system and method discern a relative priority among incoming packets, distribute packets with a relatively high priority and discard packets with a relatively low priority. Additionally, packet traffic are policed and discarded according to packet type, quantity or other predetermined criteria. The present invention performs in periodic mode, demand mode or both, and can be implemented as a hardware solution, a software solution, or a combination thereof.

17 Claims, 7 Drawing Sheets

SINGLE CYCLE WEIGHTED RANDOM EARLY DETECTION CIRCUIT AND METHOD

RELATED APPLICATION

The present application claims priority to U.S. Provisional Patent Application Ser. No. 60/341,342, filing date Dec. 14, 2001, the entire content of which is incorporated herein by reference.

BACKGROUND OF THE INVENTION

1. Field of the Invention

The present invention relates generally to a system and method for traffic management of packets traversing a communications network. More particularly, the present invention provides an intelligent solution for discriminatory packet discard according to predetermined priority and traffic levels.

2. Description of the Background Art

Current technology provides communication services via a connectionless network such as the Internet. These services are implemented using packet technology, whereby relatively small units called packets are routed through the network to an input queue in a destination system based on the destination address contained within each packet. Breaking communication down into packets allows the same data path to be shared among many users in the network. Such use, however, often results in network congestion and resultant delays in receipt of communications. For example, network traffic often fills input queues faster than processing mechanisms can disperse the content, thus causing a bottleneck in the communication process.

Current art and prior art technology utilize various methods of traffic management in an attempt to alleviate packet glut of this kind. Typically, current art and prior art utilize various algorithms to check queue levels. When the queue level exceeds acceptable thresholds, the incoming packets are randomly discarded. While the prior art and current art methods are able to alleviate queue congestion to some degree, such methods fall prey to a number of inherent disadvantages. Specifically, the aforementioned methods arbitrarily discard all packets when the queue reaches a predetermined level, and continue to drop all packets received until the queue level recedes to a point below the predetermined level of congestion. This necessitates the retransmission and processing of all dropped packets, resulting in process inefficiency, distribution delay, and general substandard processing performance. These methods further fail to discriminate between packets, merely selecting all packets for discard after a predetermined queue threshold is reached. Thus, packets deemed high priority are discarded at the same rate and same time as packets having lower priorities, necessitating a resend of all discarded packets, regardless of priority. The time lost in reprocessing packets of higher priority negates the benefit of an orderly system of transmission according to priorities, with resultant negative business ramifications.

Yet another disadvantage resides in the current state-of-art hardware devices, which limit the use of efficient algorithms and utilize cumbersome hardware configurations, resulting in inefficient processes. For example, certain algorithms utilize a division step. This step generally requires several cycles to complete, thus extending latency time during this particular phase of operations. (Hereafter, the terms "clock cycle" and "cycle" are used interchangeably to mean the time between two adjacent pulses of an oscillator that sets the tempo of a computer processor.) Alternatively, multiple dividers or other hardware components are required to complete the operation in parallel, resulting in inflated design, manufacturing, and purchase costs.

What is needed, therefore, is a system and method capable of optimizing both packet distribution and queue conditions without sacrificing performance objectives. Further, the system and method should encompass both hardware and software embodiments in various configurations to suit business and performance objectives.

SUMMARY

The system and method of the present invention address the issues of the current art and prior art by providing an innovative traffic management and processing solution with complex functionality whereby an average queue volume is calculated and compared to predetermined threshold values for the queue; e.g., a minimum threshold and maximum threshold. The present invention enqueues all packets so long as the queue size remains smaller than a minimum threshold value, thus permitting optimal distribution of the packets when traffic conditions are optimal. If the queue exceeds a maximum threshold value, the present invention provides the functionality to discard all packets, thus immediately acting to reduce the queue to a level conducive to efficient packet processing in spite of heavy traffic conditions. For periods of time during which the queue size remains between the minimum and maximum threshold values, the present invention calculates and discards an optimal number of packets, thus optimizing packet delivery in a congested traffic climate while alleviating queue congestion. Further, upon a discard condition, the present invention intelligently discerns between packets of varying priorities, marks low priority packets, and discards the same to permit delivery of critical packets while alleviating queue congestion. The present invention can be implemented in any combination of hardware or software.

Various embodiments of the present invention include use of a weighted random early detection (WRED) algorithm and policing functionality. Typically, WRED applies to queued packets, while policing applies to packets that cut through the buffer (hereafter, cut-through packets). The WRED algorithm randomly discards packets when input queues begin to fill. The weighted nature of the WRED enables packets deemed to be of a relatively high priority to be discarded at a lower probability than those packets of relatively low priority. The WRED functionality facilitates various implementations that perform a discard probability calculation in a single cycle; e.g., the system and method embody a hardware component solution that performs a 12-bit probability calculation in a single cycle to determine discard probabilities. The present invention supports both periodic and on-demand (per packet) single cycle operations.

The policing function marks and drops packets according to predetermined criteria. For example, if packets violate a level established by service agreement, the policing function monitors the level, selects offending packets, and discards the same. In various embodiments, the system and method supports periodic policing functionality.

In one embodiment of the present invention, a system includes an interface block for initiating memory references for label reads and updates and for interacting with an ICU; a calculation block for calculating an average queue size and calculating probability in a single cycle, the calculation block associated with the interface block. Alternatively, the system may also include a policing block for performing police updates, the policing block associated with the interface block.

In another embodiment of the present invention, a method includes the steps of determining a minimum threshold and a maximum threshold; if the average queue size is less than the minimum threshold, enqueuing an arriving packet; if the average queue size is greater than the maximum threshold, dropping the packet; if the average queue size is between the minimum threshold and the maximum threshold, calculating a packet drop probability to determine packet disposition and either enqueuing or dropping the packet, according to the determined packet disposition.

Further advantages of the invention will be brought out in the following portions of the specification, wherein the detailed description is for the purpose of fully disclosing preferred embodiments of the invention without placing limitations thereon.

DETAILED DESCRIPTION OF THE INVENTION

The present invention provides an intelligent system and method for proactive, discriminating congestion control on a per flow basis of packets traversing the Internet. In various embodiments, a Weighted Random Early Detection (WRED) monitors the incoming packet queue and optimizes distribution versus discard of packets to stabilize queue length. During optimized discard conditions, the system and method discern a relative priority among packets, distributing packets with a relatively high priority and discarding packets with a relatively low priority. Additionally, packet traffic may be policed for packet types, quantity or other criteria and discarded. Typically, the present invention performs in periodic mode, demand mode or both. A skilled artisan will recognize that the system and method disclosed herein may be implemented as a hardware solution, a software solution, or a combination thereof.

Figure 1:
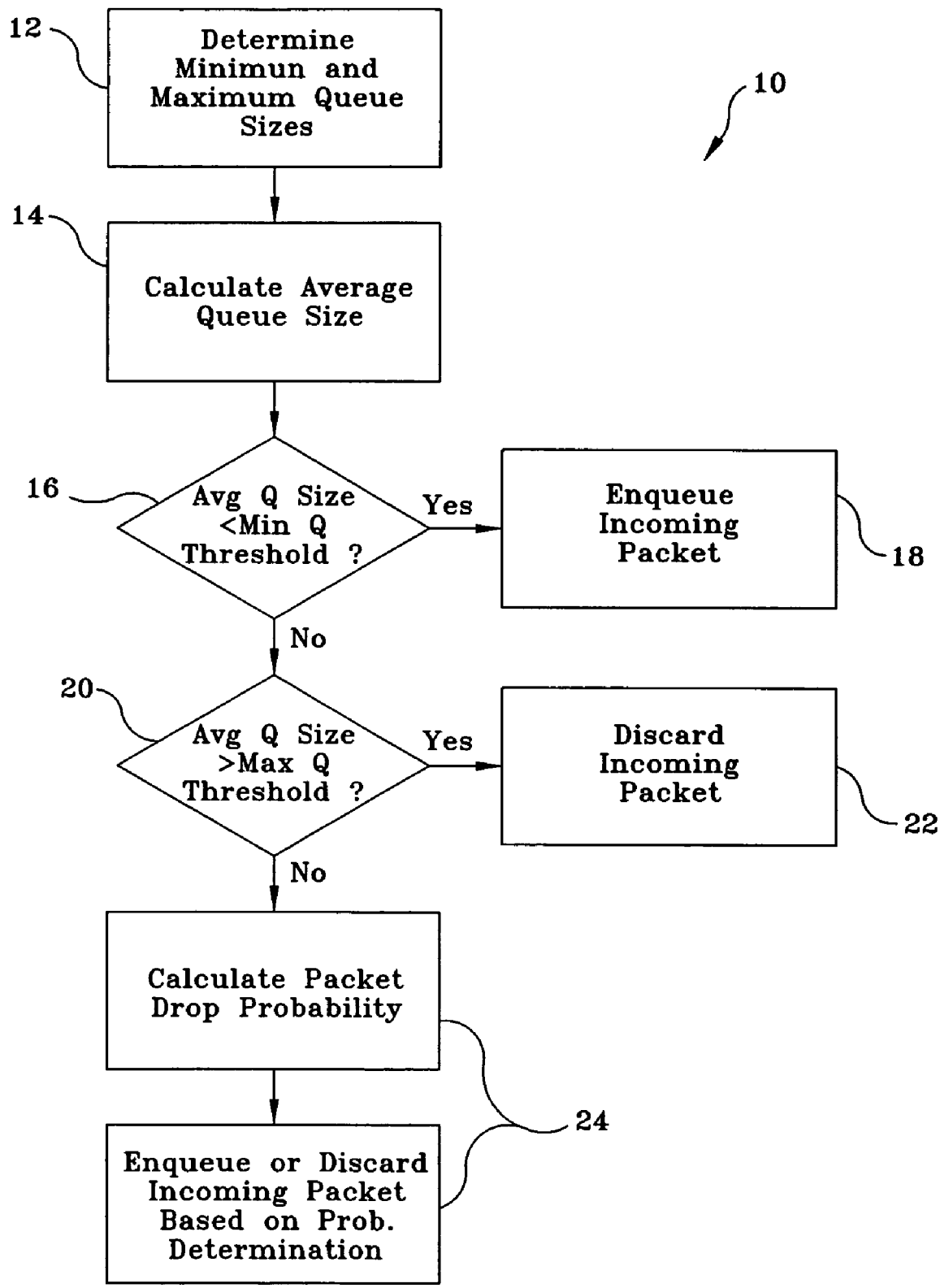
FIG. 1 illustrates a flow diagram of a method according to the present invention.

Referring specifically to the drawings, wherein like references are made to the same items throughout, a method of the present invention is generally exemplified stepwise in FIG. 1 at 10. The method includes the steps of determining a minimum threshold and a maximum threshold at 12; calculating an average queue size at 14; if the average queue size is less than the minimum threshold, enqueuing the incoming packet at 16 and 18 respectively; else if the average queue size is greater than the maximum threshold, dropping the packet at 20 and 22 respectively; else if the average queue size is between the minimum threshold and the maximum threshold, calculating a packet drop probability and either enqueu or dropping the packet according to the probability determination 24. In certain embodiments, an additional step (not shown) includes policing traffic and/or packets in accordance with predetermined criteria; e.g., selecting packets according to a criterion, marking and dropping the packets to enforce the predetermined criterion.

In the first step, the minimum threshold and maximum threshold values are determined. The minimum threshold value represents the lowest level of congestion and the point at which proactive traffic management must occur to prevent further congestion. The maximum threshold value represents the highest level of congestion, at which point all incoming packets must be discarded. These respective values are generally environmentally specific, based on such criteria as traffic pattern, flow, computer system capacity, etc.

In the second step, an average queue size is calculated using, for example, the formula:

$$\text{average} = (\text{old\_average} * (1 - \frac{1}{2}^n)) + (\text{current\_queue\_size} * \frac{1}{2}^n),$$

where average is the average size of the queue; old-average is the previous average of the queue; current_queue_size is the current size of the queue; and n is the exponential weight factor and a user-configurable value. The user-configurability of n permits the user to meet various objectives by varying n. For example, relatively high values of n minimize extreme highs or lows in queue size. The WRED process does not immediately initiate a packet drop if the queue size exceeds the maximum threshold. Once the WRED process does begin to drop packets in response to a maximum threshold condition, it may continue to drop packets for a period of time after the actual queue size has receded below a minimum threshold. Therefore, average queue size is unlikely to change very quickly over time. This slow-moving average accommodates temporary bursts in traffic. Thus, to avoid drastic swings in queue size caused by bursts in traffic, the user selects a relatively high value for n.

Conversely, if the user selects a relatively low value for n, the average queue size closely tracks the current queue size. The resultant average fluctuates with changes in the traffic levels, responding quickly to long queues. Once the queue falls below the minimum threshold, the WRED process stops dropping packets. For relatively consistent traffic patterns, the user selects a relatively low value for n, thus permitting the average queue size to fluctuate in response to traffic levels and permit packet queuing when the queue has receded below the minimum threshold.

As a skilled artisan will note, values for n falling within the range generally defined between relatively high and relatively low permit the user to configure the process according to varying degrees and varying objectives; e.g., setting n to a value whereby some fluctuation of the queue size occurs, resulting in the benefits associated with the curtailment of packet dropping when the queue size recedes below the minimum threshold vis-a-vis an extreme low value of n whereby the WRED process overreacts to temporary traffic bursts and drop packets unnecessarily or an extreme high value of n, whereby complete nonreaction to congestion occurs, and packets are transmitted and dropped as if the WRED process were not in effect.

In the third step, the average queue size is compared to the minimum threshold value. If the average queue value is less than the minimum threshold value, then the packet is enqueued. If the average queue size exceeds the maximum threshold value, then the packet is automatically discarded. Finally, for average queue values in the range of minimum threshold value to maximum threshold value, the method calculates a packet drop probability (Pdrop) at 24 and accordingly either enqueues or drops the incoming packet.

The drop probability calculation is based on the minimum threshold value, maximum threshold value, and a mark probability denominator. For example, the drop probability Pdrop may be calculated according to the formula:

$$Pdrop=Pdmax*(avqlen-min\_th)/(max\_th-min\_th),$$

where Pdmax is a maximum probability; avqlen is a periodic or per packet average queue length; min_th is a minimum threshold under which all packets must be accepted; and max_th is a maximum threshold over which all packets can be dropped.

Figure 2:
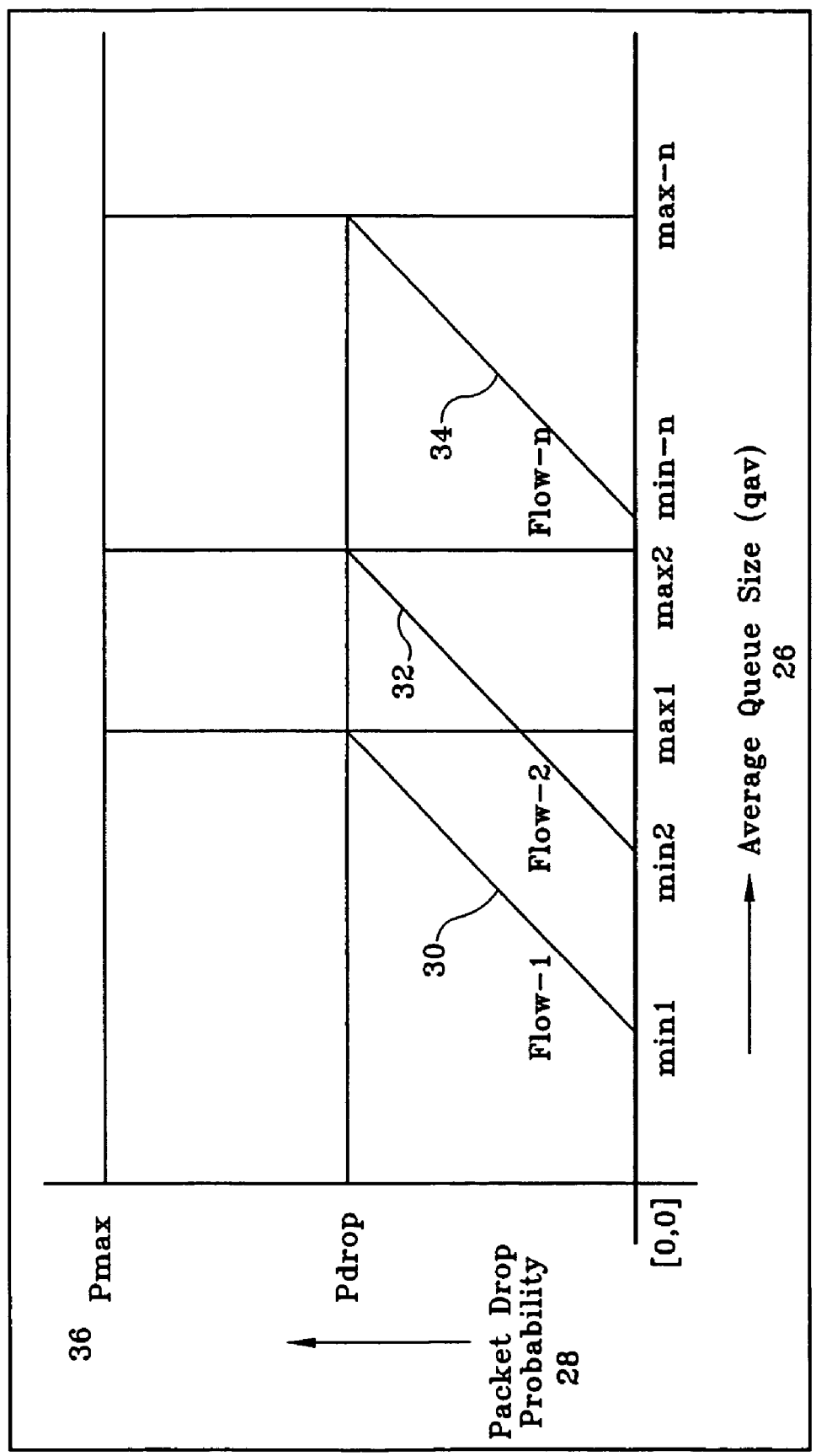
FIG. 2 illustrates a WRED drop probability graph on a per flow basis according to the present invention.

When the average queue size exceeds the minimum threshold value, the WRED process begins to drop packets. The rate of drop increases linearly as the average queue size increases until the average queue size reaches the maximum threshold. Referring now to FIG. 2, this concept is graphically illustrated having an x-axis 26 representing the average queue length, a y-axis 28 representing the drop probability, wherein the rate of drop for flow-1 at 30, the rate of drop for flow-2 at 32 and the rate of drop for flow-n at 34 increase linearly as the average queue length increases, until the average queue length reaches Pmax 36. When the average queue length exceeds Pmax 36; i.e., the maximum threshold, all packets are dropped.

The mark probability denominator is the fraction of packets dropped when the average queue size reaches the maximum threshold. For example, if the denominator is 512, one out of every 512 packets is dropped when the average queue size is greater than the maximum threshold value. The minimum threshold value should be set high enough to maximize the link utilization else packets may be unnecessarily dropped, resulting in less than optimal utilization of the link. The difference between the maximum threshold and the minimum threshold should be large enough to avoid global synchronization. If the difference is too small, many packets may be dropped at once, resulting in global synchronization.

Figure 3:
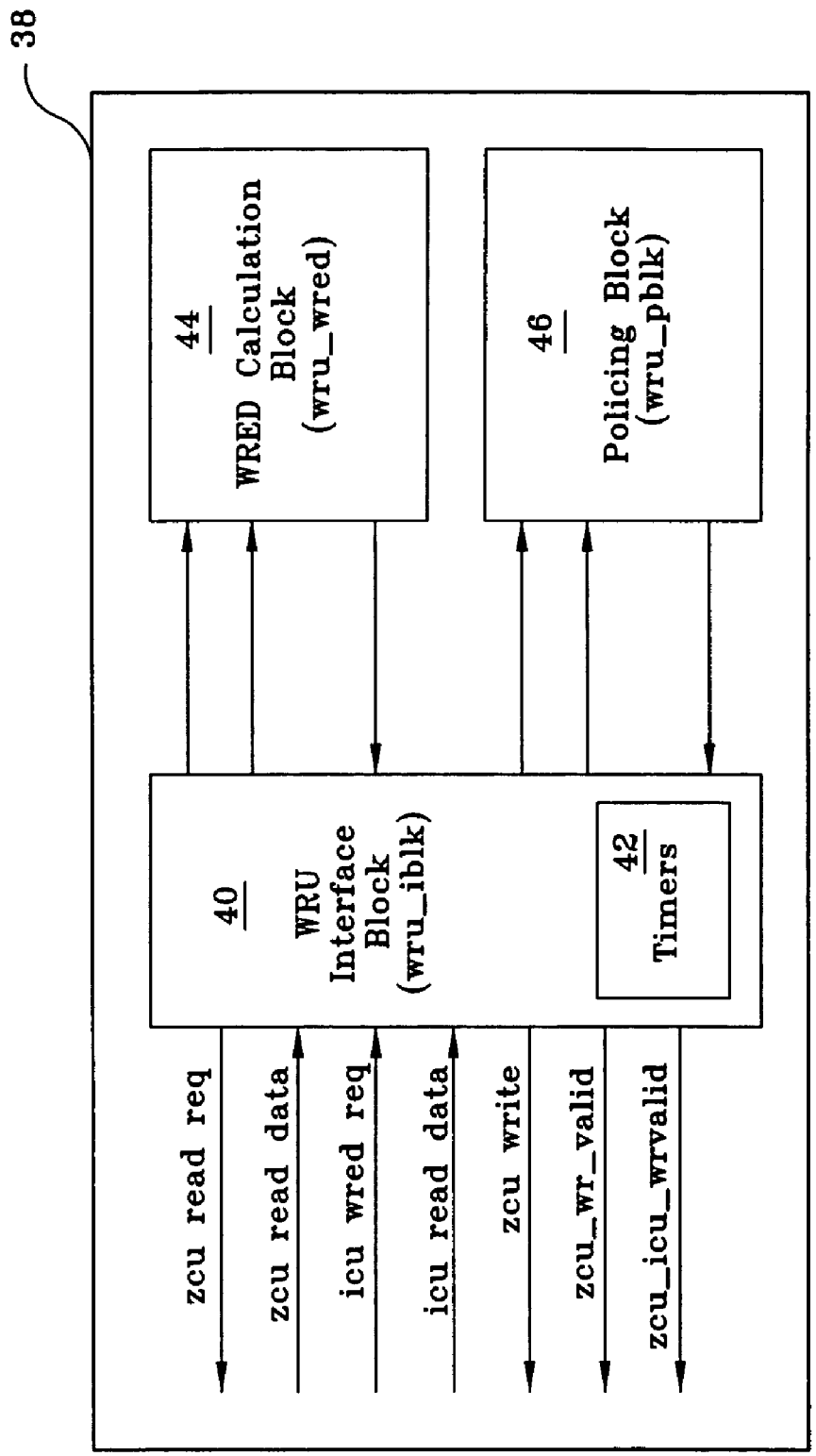
FIG. 3 illustrates a block diagram of the WRED units according to the present invention.

Turning now to FIG. 3, there is shown generally at 38 a block diagram of the present invention. The system includes an interface block 40 for initiating memory references for label reads and updates as well as for interacting with an Ingress Control Unit (ICU). In various embodiments, the interface block 40 further comprises at least one timer 42 associated with timing control. A calculation block 44 calculates on periodic basis an average queue size and probability determination for the next incoming packet. The calculation block 44 further performs the probability determination calculation on a demand basis per request from the ICU. A policing block 46 performs police updates such as marking and dropping packets that violate service level agreements on a per-flow basis.

The following Table 1 provides an exemplar of interface signals that are associated with WRED process components such as the interface block. The table includes columned information categorized according to Signal Name, Dir and Signal Description.

TABLE 1

| Signal Name | Dir | Signal Description |
| --- | --- | --- |
| wru_enable | 1 | This is a signal defined in the CSR to initiate the WRU to start the state machines and initiate memory references to label data structures. If this signal is inactive, the WRU unit simply goes into powderdown mode. |
| first_flowid_addr[20:0] | 1 | This value is present in a control register outside this unit. This value is programmed before the Canary starts packet processing. This value is used to send out the first label entry read request by the WRU interface block. Each read request is programmed for 8 word (32-bit) burst read. |
| max_flowcnt[19:0] | 1 | This is a static value coming from the control register unit as well. The max flowid count indicates the number of flow ids that need to be supported for periodic WRED and policing functions. |
| wred_cyclecnt[31:0] | 1 | This 32-bit static value coming from a CSR indicates the number of wait states between each WRED calculation. |
| zcu_rddata[31:0] | 1 | Read data coming from the ZCU. |
| zcu_rddata_valid | 1 | The incoming read data from ZCU is valid |
| zcu_readvalid | 1 | Decoded read id signal coming from the ZBT controller ZCU |
| Icu_rddatar[31:0] | 1 | Data coming in from ICU for demand based WRED calculation. The fields on this bus are:<br>[9:0]-Average queue length value<br>[19:10]-Minimum queue length<br>[29:20]-Range of the queue length for this flow (max-min)<br>[31:30]-Reserved |
| Icu_rd_valid | 1 | ICU read data is valid with average queue length, minimum, and maximum queue length info on the data bus. |
| Icu_wred_req | 1 | ICU is requesting a priority demand based WRED calculation |
| wru_cmdvalid | 0 | Read or Write command is valid from the WRED and policing unit. This command goes to the ZCU for arbitration and ZBT reads/writes. |
| wru_cmd[31:0] | 0 | Wru_cmd contains the command to be executed by the ZCU and the starting address of the memory reference. Look into ZCU spec for command format. |
| wru_wr_valid | 0 | Indicates a valid write is in progress in the current cycle. |
| wru_icu_wr_valid | 0 | Indicates a valid write is in progress to the ICU in response to the WRED calculation request. |
| wru_wrdata[31:0] | 0 | Write data from WRED unit to the ZCU arbiter FIFO or ICU. |

Figure 4:
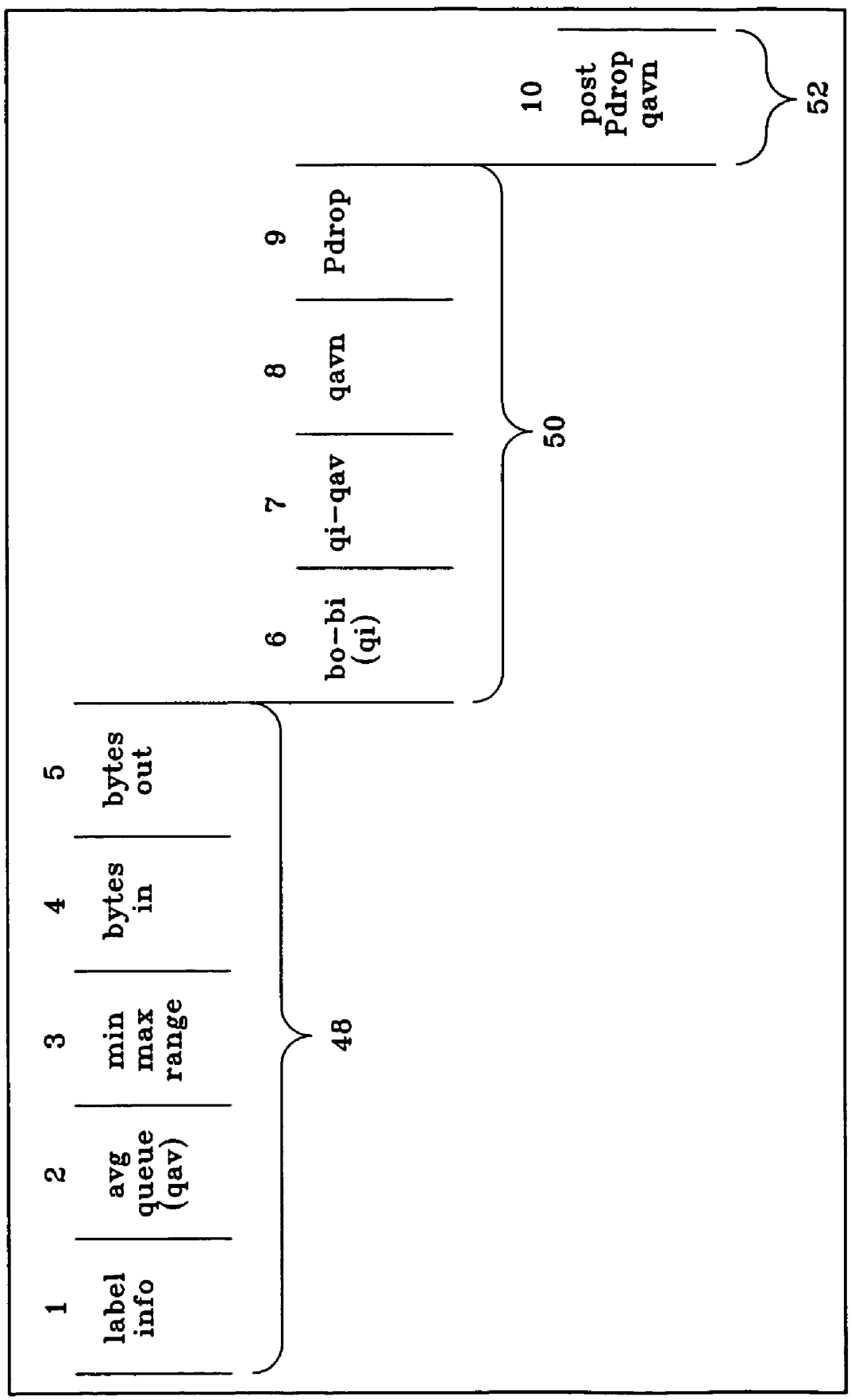
FIG. 4 illustrates a pipeline structure according to the present invention.

With reference to FIG. 4, there are shown pipeline structures according to the system of the present invention. The three simple pipeline structures (with a stall mechanism, not shown) include pipeline 1 at 48, pipeline 2 at 50, and pipeline 3 at 52. Typically, the system reads in a per flow data structure during the first five cycles (pipeline 1). For example, in the first cycle, the system processes label information (label info). In the second cycle, the system calculates the average queue size (qav); then compares it against the minimum threshold and maximum threshold (min max range) in the third cycle. The system determines values for bytes in and bytes out in the fourth and fifth cycles, respectively. During the next four cycles (pipeline 2), the system completes computation of an instantaneous queue length, and a new average queue length, and a packet drop probability calculation. For example, the system computes an instantaneous queue length in the sixth cycle from the difference between bytes out (bo) and bytes in (bi). In the seventh and eighth cycles, the system determines the difference between the instantaneous queue length (qi) and the queue average (qa) and calculates the new queue average (qavn). In the ninth cycle, the system performs an entire packet drop probability calculation (Pdrop). Finally, the system calculates a new queue average (qavn) after packet dispensation determined by Pdrop.

Figure 5:
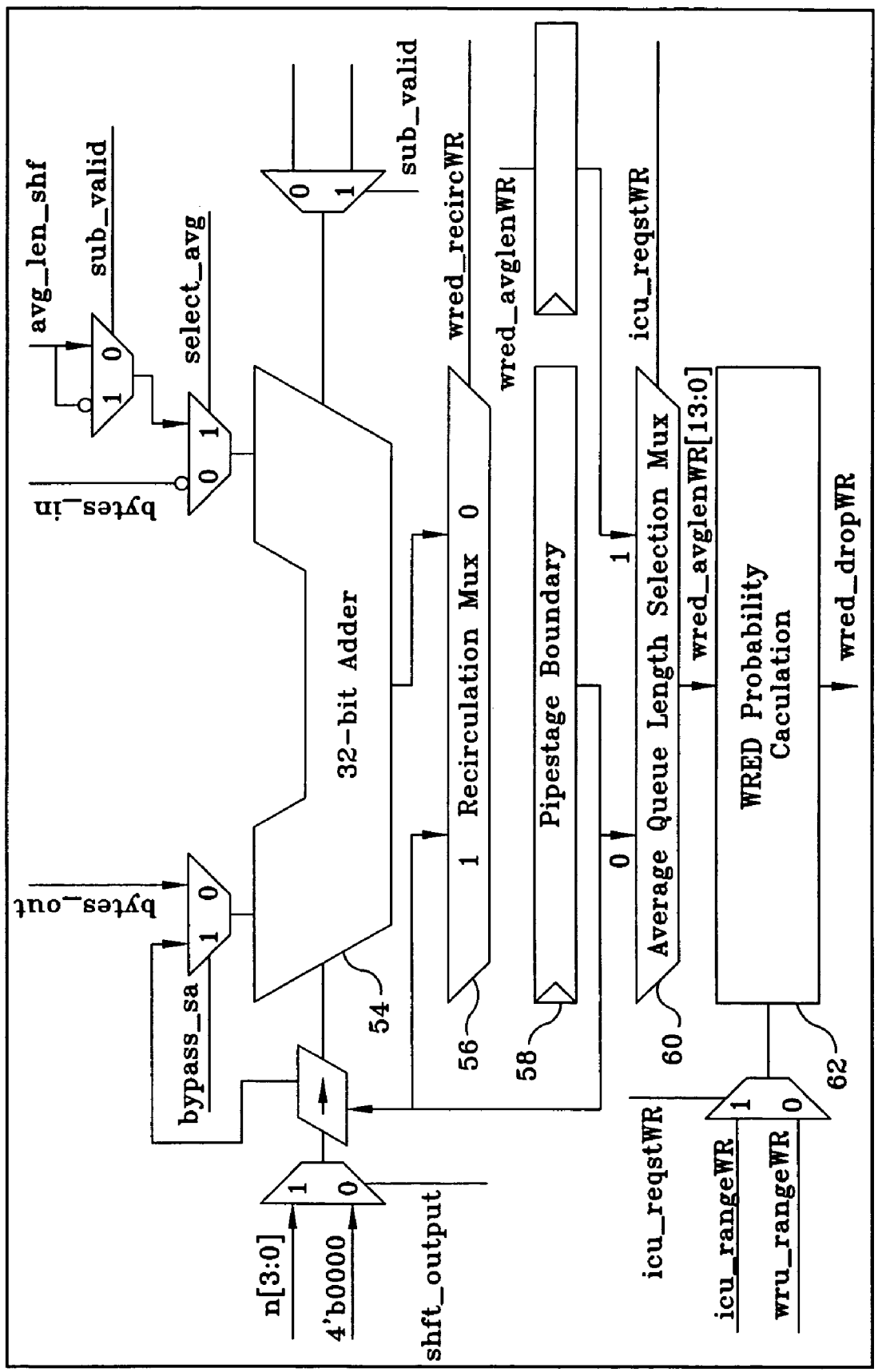
FIG. 5 illustrates a schematic of an average queue length calculation hardware implementation according to the present invention.

With reference to FIG. 5, there is illustrated a schematic of an average queue length calculation hardware implementation according to the present invention, including a 32-bit adder 54, a recirculation mux 56, a pipestage boundary component 58, an average queueu length selection mux (multiplexor) 60, and a WRED probability calculation register 62. The single 32-bit adder 54 computes the instantaneous queue length and the new average queue length for periodic WRED. The hardware also accommodates uninterrupted per packet WRED by inserting the per packet WRED requests in the Pdrop cycle (referenced in FIG. 4 at 52) and recirculating new average queue length (periodic, per flow) in the recirculation mux 56 till no current per packet WRED requests remain.

Figure 6:
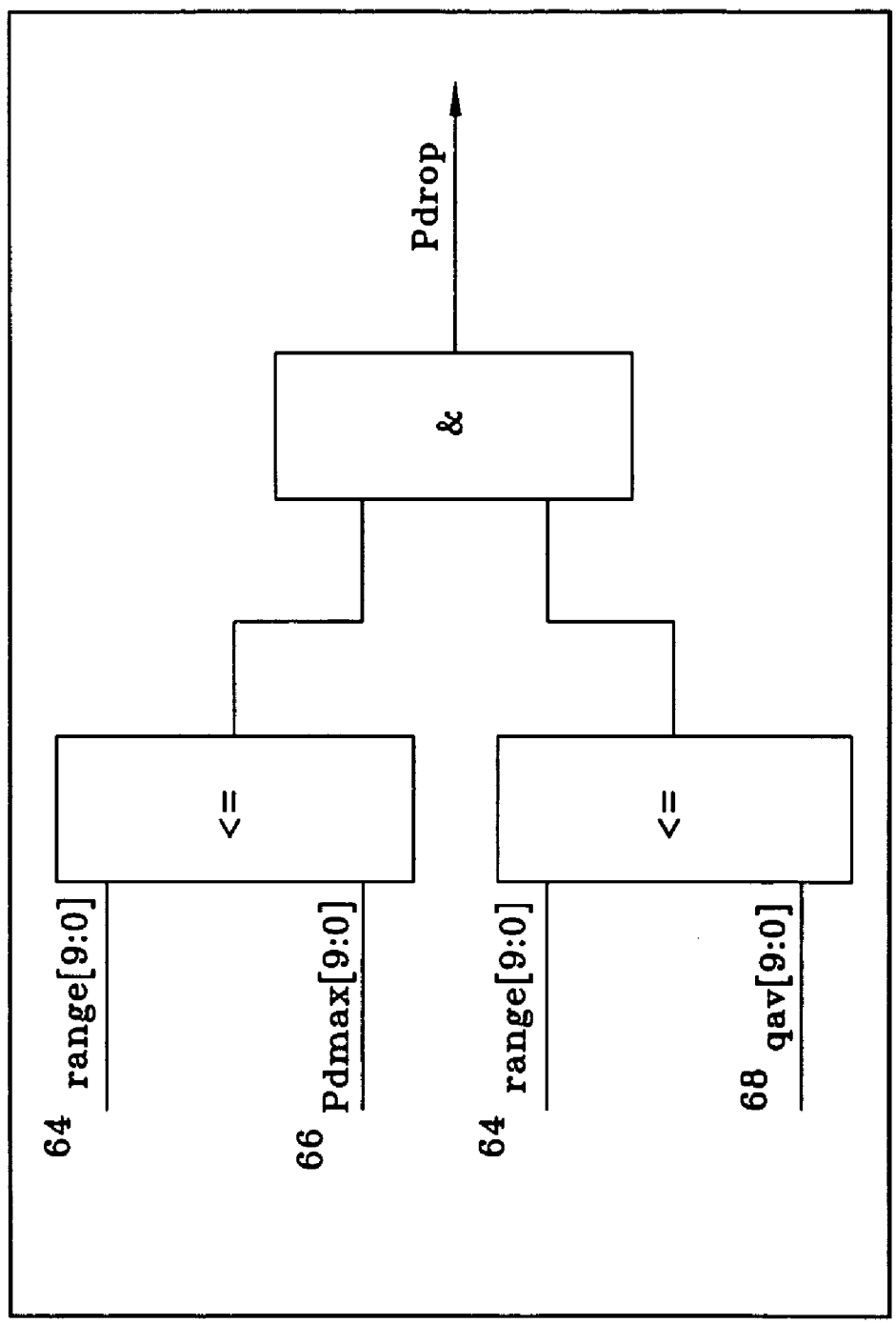
FIG. 6 illustrates a schematic of a probability calculation according to the present invention.

With reference to FIG. 6, there is illustrated a schematic of a probability calculation hardware implementation according to the present invention, having a range 64, Pdmax 66, a maximum probability (scaling factor), a qav 68, queue average, and Pdrop 9.

Figure 7:
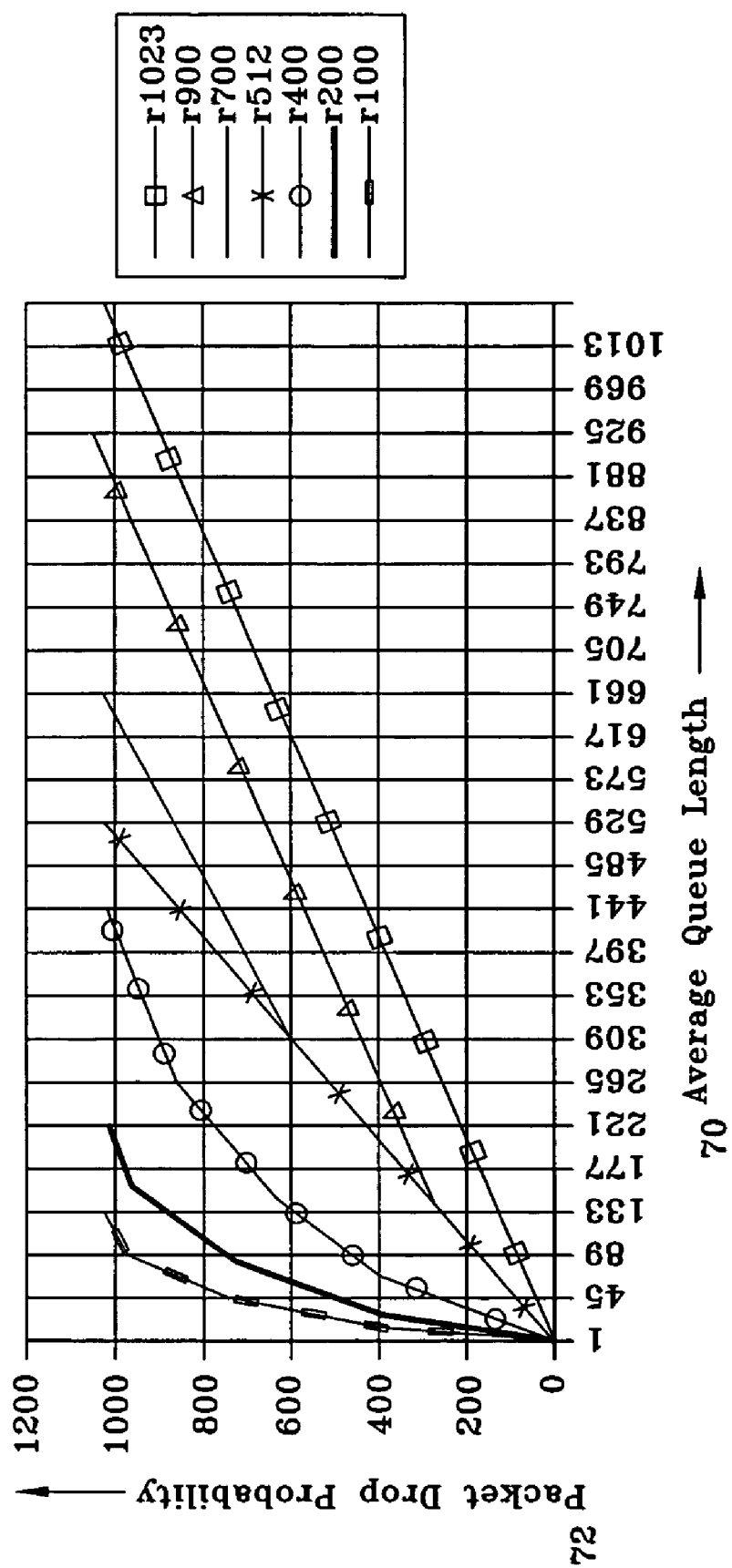
FIG. 7 illustrates in graphical form a simulation of a single cycle WRED implementation according to the present invention.

Turning to FIG. 7, there is illustrated in graphical form a simulation of a single cycle WRED implementation according to the present invention; i.e., the aforedescribed hardware implementation of a single cycle WRED Pdrop computation is simulated across a range of average queue lengths and the summary of the results are shown. It is noted that average queue lengths 70 are plotted along the x-axis, the packet drop probability is plotted along the y-axis 72.

Having illustrated and described the principles of the system and method of the present invention in various embodiments, it should be apparent to those skilled in the art that the embodiment can be modified in arrangement and detail without departing from such principles. For example, the physical manifestation of the hardware media may be changed if preferred. Therefore, the illustrated embodiments should be considered only as example of the invention and not as a limitation on its scope. Although the description above contains much specificity, this should not be construed as limiting the scope of the invention but as merely providing illustrations of some of the presently preferred embodiments of this invention. Further, it is appreciated that the scope of the present invention encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention for it to be encompassed by the present claims. Furthermore, no element, component, or method step in the present disclosure is intended to be dedicated to the public regardless of whether the element, component, or method step is explicitly recited in the claim. No claim element herein is to be construed under the provisions of 35 U.S.C. 112, sixth paragraph, unless the element is expressly recited using the phrase "means for".

The invention claimed is:

1. A method for regulating network packet traffic, the method comprising the steps of:
   determining a minimum threshold and a maximum threshold;
   calculating an average queue size according to a following formula:

$$\text{average} = (\text{old\_average} * (1 - \frac{1}{2}^n)) + (\text{current\_queue\_size} * \frac{1}{2}^n),$$

wherein the average is the average size of a queue; the old-average is a previous average of the queue; the current_queue_size is a current size of the queue; and n is an exponential weight factor and a user-configurable value;
   when the average queue size is less than the minimum threshold, enqueuing an arriving packet;
   when the average queue size is greater than the maximum threshold, dropping the packet;
   when the average queue size is between the minimum threshold and the maximum threshold,
   calculating a packet drop probability (Pdrop); and
   performing one of a set consisting of enqueuing and dropping the packet, according to the calculated probability.

2. The method of claim 1 wherein the minimum threshold and the maximum threshold are individually determined based on at least one criterion selected from a group consisting essentially of traffic pattern, flow, and computer system capacity.

3. The method of claim 1, wherein the step of calculating a packet drop probability further comprises calculating the packet drop probability according to formula:

$$\text{Pdrop} = \text{Pdmax} * (\text{avqlen} - \text{min\_th}) / (\text{max\_th} - \text{min\_th})$$

wherein Pdmax is a maximum probability; avqlen is one of a set consisting of a periodic and a per packet average queue length; min_th is a minimum threshold under which all packets must be accepted; and max_th is a maximum threshold over which all packets can be dropped.

4. The method of claim 1, wherein the step of calculating a packet drop probability is performed in a single cycle.

5. The method of claim 1, further comprising the step of policing packets according to a predetermined criterion.

6. The method of claim 1, further comprising the step of calculating the packet drop probability on at least one of a set consisting of a demand basis and a periodic basis.

7. The method of claim 1, further comprising the step of generating a new average queue length per flow.

8. A method for regulating network packet traffic, the method comprising the steps of:
   determining a minimum threshold and a maximum threshold;
   calculating an average queue size according to a following formula, $$\text{average} = (\text{old average} * (1 - \frac{1}{2}^n)) + (\text{current\_queue\_size} * \frac{1}{2}^n),$$

wherein the average is the average size of a queue; the old-average is a previous average of the queue; the current_queue_size is a current size of the queue; and n is an exponential weight factor and a user-configurable value;

when the average queue size is less than the minimum threshold, enqueuing an arriving packet;

when the average queue size is greater than the maximum threshold, dropping the packet;

when the average queue size is between the minimum threshold and the maximum threshold, calculating a packet drop probability in a single cycle, and either enqueuing or dropping the packet according to the calculated probability; and policing packets according to a predetermined criterion.

9. The method of claim 8, wherein the step of calculating a packet drop probability further comprises calculating the packet drop probability according to formula:

$$Pdrop=Pdmax*(avqlen-min\_th)/(max\_th-min\_th)$$

wherein Pdmax is a maximum probability; avqlen is one of a set consisting of a periodic and a per packet average queue length; min_th is a minimum threshold under which all packets must be accepted; and max_th is a maximum threshold over which all packets can be dropped.

10. A system for management of packet traffic, the system comprising:

an interface block for initiating memory references for label reads and updates, and interacting with an Ingress Control Unit (ICU);

a calculation block for calculating an average queue size according to a formula and calculating packet drop probability depending on the average queue size, the calculation block associated with the interface block, the formula being:

$$average=(old\ average*(1-\tfrac{1}{2}^n))+(current\_queue\_size*\tfrac{1}{2}^n),$$

wherein the average is the average size of a queue; the old-average is a previous average of the queue; the current_queue_size is a current size of the queue; and n is an exponential weight factor and a user-configurable value; and a policing block for performing police updates, the policing block associated with the interface block.

11. The system of claim 10, wherein the packet drop probability is calculated in a single cycle.

12. The system of claim 10, wherein the interface block further comprises a timer.

13. The system of claim 10, further comprising at least one interface signal.

14. The system of claim 13, wherein the at least one interface signal is selected from a group essentially consisting of wru_enable; first_flowid_addr max_flowcnt; wred_cyclecnt; zcu_rddata; zcu_rddata_calid; zcu_readvalid; and icu_rddata.

15. The system of claim 10, wherein the calculation block performs packet drop probability calculations on a periodic basis.

16. The system of claim 10, wherein the calculation block performs packet drop probability calculations on a demand basis.

17. The system of claim 10, wherein the calculation block further calculates a new average queue size.

* * * * *